July 24, 1923.
H. J. ADAMS
WHEEL
Filed April 27, 1921
1,462,754
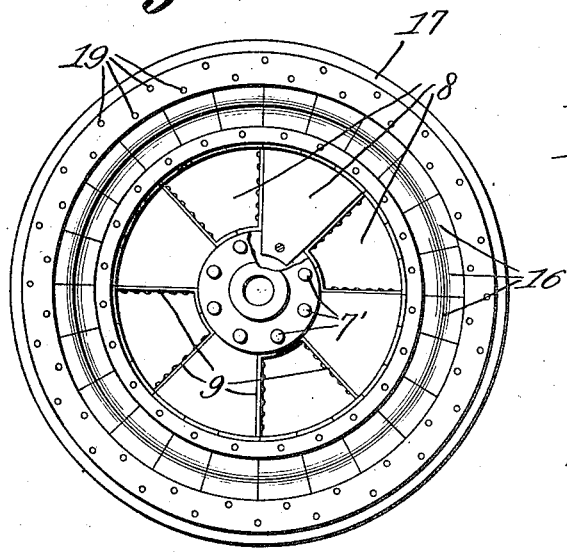
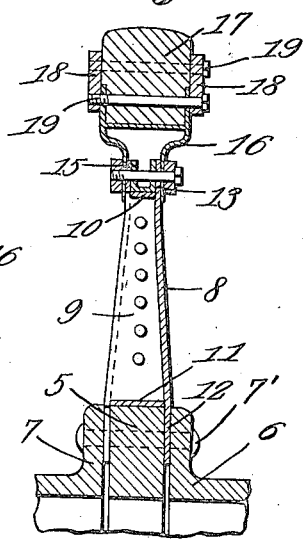
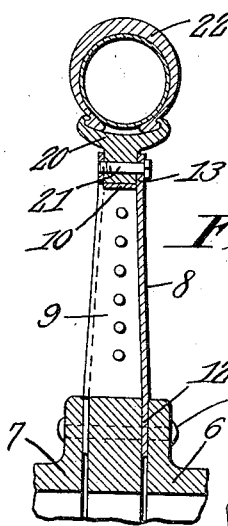
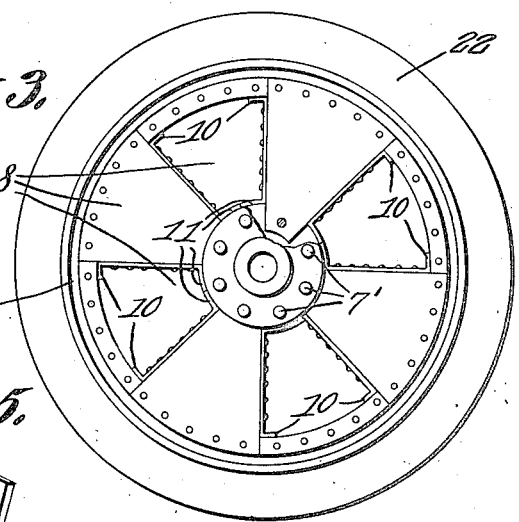
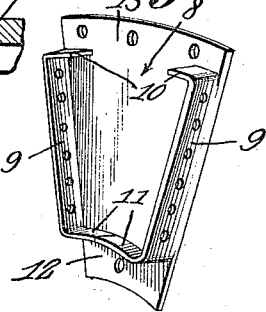
Inventor,
H. J. Adams.
By C. A. Snow & Co.
Attorneys Patented July 24, 1923.

1,462,754

UNITED STATES PATENT OFFICE.

HENRY JEWETT ADAMS, OF DENVER, COLORADO.

WHEEL.

Application filed April 27, 1921. Serial No. 464,810.

*To all whom it may concern:*

Be it known that I, HENRY JEWETT ADAMS, a citizen of the United States, residing at Denver, in the county of Denver and State of Colorado, have invented a new and useful Wheel, of which the following is a specification.

This invention relates to wheel constructions, and more particularly to a metallic wheel construction designed to replace the wooden wheel now in use.

The primary object of the invention is to provide a wheel made up of a plurality of metallic sections, the sections being of novel construction and support the hub of the wheel in spaced relation with the felloe thereof.

A further object of the invention is to provide metallic sections having means to permit the same to be secured together in the construction of the wheel in a manner to prevent displacement thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a wheel constructed in accordance with the present invention, the hub thereof being partly broken away to illustrate the connection between the spokes and hub.

Figure 2 is a fragmental sectional view through the wheel.

Figure 4 is a fragmental sectional view through a wheel showing a pneumatic tire as applied thereto.

Figure 3 is a side elevational view of a wheel especially adapted for use with a pneumatic tire.

Figure 5 is a perspective view of one of the section plates.

Referring to the drawing in detail, the wheel includes a hub comprising a central section 5 and the lateral sections 6 and 7 respectively, which sections are secured together by means of the bolts 7' which pass through registering openings in the central section and lateral sections.

The body portion of the wheel is made up of a plurality of metallic sections 8 substantially sector-shape, each section being provided with flanges 9 extending along the side edges thereof, the ends of the flanges extending inwardly as at 10 and 11, the flanges 11 being slightly curved to conform to the curvature of the hub sections.

Due to the construction of the inturned ends 11, an extension 12 is provided at the base of each section, there being an extension 13 formed at the opposite end thereof, which flanges or extensions are provided with openings to accommodate suitable securing bolts, the bolts 14 being provided for securing the upper end of each extension to the felloe of the wheel.

The extensions 12 are clamped between the outer sections and inner section of the hub, where the same are secured in such position as by means of the bolts 7 which pass through the openings formed therein. Thus it will be seen that the sections of the wheel are secured against displacement.

The outer extension 13 lies flush with a circular member 15 which is substantially U-shaped in cross section, it being understood that predetermined sections are secured to one side of the circular member, while the remaining sections 8 are secured to the opposite side thereof, thereby bracing the wheel proper, against lateral strains.

Secured to the sections 8 are a plurality of metallic members 16 formed preferably of resilient metal, whereby the desired resiliency will be directed to the wheel, when the same meets with obstructions in the surface over which the same is operated.

These sections 16 are arranged in circular formation, the side edges thereof contacting to brace the sections. The rim or felloe of the wheel is formed by these sections, the tire 17 being formed of suitable rubber and disposed between the sections of the opposite sides of the wheel. Plates 18 are secured to opposite sides of the tire 17 and overlap portions of the sections 16 on opposite sides of the wheel, so that when the bolts 19 are properly positioned, the sections 16 are brought into close engagement with the tire 17 and held in such position against movement.

The flanges 9 of each of the sections 8 are provided with spaced openings disposed throughout the lengths thereof, which openings align with openings of the flanges of the adjacent section 8 and accommodate rivets or the like, whereby the sections may be secured together.

In the form of the invention as illustrated by Figures 3 and 4 of the drawings, the structure is one especially adapted for use in connection with pneumatic tires, and in this form the flanges 12 of the sections 8 are secured to the hub in a manner as disclosed, while the flanges 13 of the sections have connection with a felloe 20, there being provided bolts 21 for securing the sections to the felloe.

The pneumatic tire is indicated at 22 and may be secured to the felloe 20 in the usual and well known manner as by a removable rim or clincher principle.

Having thus described the invention, what is claimed as new is:—

In a wheel construction, the combination of a sectional hub and a rim associated therewith, a body portion including a plurality of sections, each of said sections comprising a metallic plate, each of said plates having inwardly extended flanges formed along the side edges thereof, said flanges being disconnected from the plate throughout portions of their lengths, the ends of said flanges being bent inwardly to provide supporting surfaces, the outer ends of said plates adapted to be secured to the rim, the inwardly extended outer ends of the flanges adapted to engage the rim, the inwardly extended flanges of the inner ends of the plates adapted to rest on the hub, portions of the inner ends of the plates extending between sections of the hub, and means for securing the plates together.

In testimony that I claim the foregoing as my own, I have hereto affixed my signature in the presence of two witnesses.

HENRY JEWETT ADAMS.

Witnesses:
 Rose Robbins,
 Elizabeth Cassidy.